UNITED STATES PATENT OFFICE.

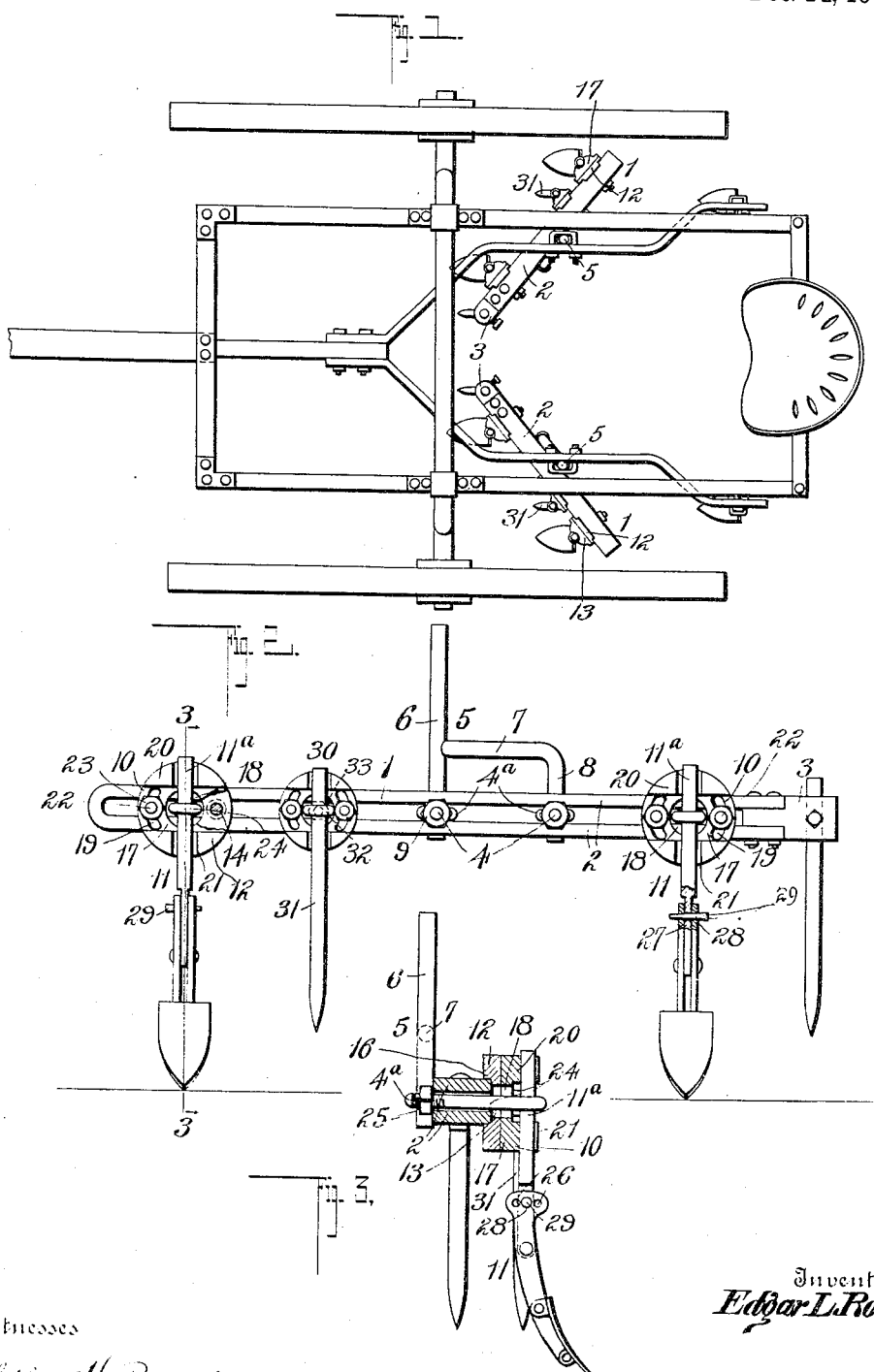

EDGAR L. ROSS, OF HICO, TEXAS.

CULTIVATOR ATTACHMENT.

943,316.      Specification of Letters Patent.      Patented Dec. 14, 1909.

Application filed July 28, 1909. Serial No. 509,970.

*To all whom it may concern:*

Be it known that I, EDGAR L. ROSS, a citizen of the United States, residing at Hico, in the county of Hamilton and State of Texas, have invented certain new and useful Improvements in Cultivator Attachments, of which the following is a specification.

This invention relates to an attachment for cultivators, and more particularly to an attachment whereby a four plow cultivator can be converted into a six, or more, plow cultivator, and also a harrow.

The object of the invention comprehends the production of a device of this character which will be extremely simple in construction and can be easily and readily applied to the usual four plow cultivator without changing any of its parts.

The invention is illustrated in the accompanying drawings, in which—

Figure 1 is a top plan view showing the invention applied to a cultivator; Fig. 2 is a side elevation thereof, detached; Fig. 3 is a vertical sectional view taken on the line 3—3 of Fig. 2.

Referring specifically to the drawings, 1 indicates a frame comprising a flat piece of metal bent to form longitudinal spaced bars 2, to which the several parts of my invention are attached. The free ends of the bars 2 are united by blocks 3, for a purpose to be hereinafter described.

Secured to the bars 2, by means of eye bolts 4 is a member 5 comprising a vertical stem 6 and an offset portion 7 extending at right angles to the stem and having its end bent downwardly, as indicated at 8. Passing around the lower ends of the stem 6 and the portion 7 are the eyes 4ª of the bolts 4, and by extending the stems of said bolts 4 transversely between the bars 2 of the frame 1 and tightening the clamping nuts 9 against the adjacent edges of said bars 2, the member 5 is securely held in position on the frame 1.

Located adjacent opposite ends of the frame, and on the same side thereof, are adjustable cuffs 10 to which the plow feet 11 are secured, in a manner to be hereinafter described. Each of the cuffs 10 comprises rear plates 12 provided with a central opening 13 and diametrically opposite openings 14, arranged midway between said opening 13 and the periphery of the plate. These plates 12 are also provided with projections 15 arranged diametrically opposite and at right angles to the openings 14 adapted to have their straight faces 16 engage opposite edges of the bars 2, to prevent the rear plates from turning. Placed adjacent the outer faces of the rear plates 12 are front plates 17 also provided with a central opening 18 which registers with the opening 13, and diametrically opposite slots 19 arranged concentric with the openings 14. Secured to the outer faces of the front plates 17 are projections 20 provided with vertical grooves 21.

The manner of assembling the parts above described is as follows: The plates 12 and 17 are connected by bolts 22 passing transversely through the openings 14 and slots 19, and held therein by nuts 23. The plates are then placed against the edges of the bars 2 and the stems 11ª of the feet 11 placed in the vertical grooves 21, the eyes of the eye bolts 24 are then placed around the stems 11ª and passed through the openings 13 and 18 and transversely between the bars 2 and securely held in place by tightening the clamping bolts 25 against the adjacent edges of said bars. It will thus be seen that by loosening the nuts 23 of the bolts 22, the front plates 17 may be turned on the rear plates 12 to the extent of the slots 19, and as the stems 11ª of the plow feet 11 are securely connected to said front plates, the tilt of said plow feet can be adjusted.

To regulate the depth to which the plows enter the ground, I provide the upper ends of the side bars of the feet with a series of transverse openings 26 which are adapted to register with an opening 27 formed in the stems 11ª. It will be seen by reference to the drawings that the stems 11ª are pivotally mounted between the side bars of the feet, as at 28. A pin 29 passed through certain of the openings 26 and the opening 27 serves to hold the feet at the desired adjustment.

By removing the cuffs 10 and plow feet 11 from the frame 1, and attaching a number of similar cuffs 30, similar to the cuffs 10, only smaller, and securing thereto the shanks of the harrow teeth 31, by means of eye bolts 32 and clamping nuts 33, the cultivator may be converted into a harrow.

Mounted in an opening 3ª formed in the hereinbefore mentioned block 3 is the shank of a harrow tooth 35, which is securely held in place by a set screw 36.

While I have only described the construction of one frame it will be understood that two are to be used, as shown in Fig. 1, and as both frames are identical, a description of both will not be necessary.

The manner of attaching the frames 1 to the cultivator beams is as follows: Remove the front plows from the cultivator beams and insert the upper ends of the stems 5 into the eyes of the bolts from which the plows were removed, and by proper adjustment of the cuffs and plow feet the plows carried by the beams can be adjusted to correspond to the rear plows, which are left on the beams.

I claim:

In an attachment for cultivators, a pair of frames comprising longitudinally spaced bars, adjustable cuffs having plow feet secured thereto, eye bolts for securing said feet and cuffs to the bars, and means for attaching said bars to the forward end of the cultivator beams.

In testimony whereof I affix my signature, in presence of two witnesses.

EDGAR L. ROSS.

Witnesses:
C. E. RODGERS,
E. C. RODGERS.